United States Patent
Kim

(10) Patent No.: US 10,578,057 B2
(45) Date of Patent: Mar. 3, 2020

(54) SYSTEM FOR CLEANING FUEL CAP VALVE OF VEHICLE

(71) Applicants: Hyundai Motor Company, Seoul (KR); Kia Motors Corporation, Seoul (KR)

(72) Inventor: Jong Hee Kim, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 183 days.

(21) Appl. No.: 15/686,393

(22) Filed: Aug. 25, 2017

(65) Prior Publication Data

US 2018/0163670 A1    Jun. 14, 2018

(30) Foreign Application Priority Data

Dec. 13, 2016  (KR) .................. 10-2016-0169202

(51) Int. Cl.
  *F02M 25/08*  (2006.01)
  *B60K 15/035*  (2006.01)

(52) U.S. Cl.
  CPC ........ *F02M 25/0836* (2013.01); *F02M 25/08* (2013.01); *F02M 25/0809* (2013.01); *F02M 25/089* (2013.01); *B60K 2015/03547* (2013.01)

(58) Field of Classification Search
  CPC ............... F02M 25/08; F02M 25/0839; F02M 25/0872; F02M 25/089; B60K 2015/03547; F02D 41/0032–004
  USPC .................. 123/518–521; 73/114.39
  See application file for complete search history.

(56) References Cited

U.S. PATENT DOCUMENTS

| | | | | |
|---|---|---|---|---|
| 6,044,314 A * | 3/2000 | Cook | ..................... | G01M 3/025 701/32.8 |
| 6,196,203 B1 * | 3/2001 | Grieve | ................... | F02M 25/08 123/198 D |
| 6,308,559 B1 * | 10/2001 | Davison | ............. | F02M 25/0809 73/114.39 |
| 2004/0250805 A1 * | 12/2004 | Osanai | .................. | F02D 41/004 123/698 |
| 2009/0288645 A1 * | 11/2009 | Childress | ............. | F02M 25/089 123/520 |
| 2012/0152210 A1 * | 6/2012 | Reddy | .................. | F02M 25/089 123/520 |

(Continued)

*Primary Examiner* — Erick R Solis
*Assistant Examiner* — Robert A Werner
(74) *Attorney, Agent, or Firm* — Morgan, Lewis & Bockius LLP

(57) ABSTRACT

A system for cleaning a fuel cap valve of a vehicle, may include a fuel cap having an air breather passage and a negative-pressure valve body configured for opening or closing the air breather passage; a canister for collecting evaporated gas inside a fuel tank to supply the evaporated gas into an engine intake system; and a negative-pressure control mechanism for controlling an engine negative pressure, which is applied from the engine intake system to the negative-pressure valve body of the fuel cap through the canister and the fuel tank, to reach a predetermined level or more, or for controlling the engine negative pressure at a repetition interval, in a fuel cap cleaning mode for cleaning the negative-pressure valve body of the fuel cap.

7 Claims, 4 Drawing Sheets

(56) References Cited

U.S. PATENT DOCUMENTS

2013/0312838 A1\* 11/2013 McLain ............ F02M 37/0076
  137/14
2014/0311461 A1\* 10/2014 Dudar ................ F02M 25/0818
  123/520

\* cited by examiner

SYSTEM FOR CLEANING FUEL CAP VALVE OF VEHICLE

CROSS-REFERENCE TO RELATED APPLICATION

The present application claims priority to Korean Patent Application No. 10-2016-0169202 filed on Dec. 13, 2016, the entire contents of which are incorporated herein for all purposes by this reference.

BACKGROUND OF THE INVENTION

Field of the Invention

The present disclosure relates to a fuel cap valve cleaning system for a vehicle, and more particularly, to a system for cleaning a fuel cap valve of a vehicle, which enables removal of foreign substances stuck in a fuel cap valve using the negative pressure of an engine.

Description of the Related Art

Generally, in a fuel tank of a vehicle, a fuel pump is fundamentally mounted to pump and supply fuel into an engine, and in addition, a canister is connected to collect evaporated fuel gas inside the fuel tank so as to supply the same into an engine intake system for combustion.

At this time, negative pressure is applied from the engine intake system toward the fuel tank through the canister while the engine is running. When the negative pressure is not removed, for example, shrinkage of the fuel tank may occur.

In order to remove this negative pressure, as illustrated in FIG. 1, a fuel cap 100, which opens or closes an inlet port of the vehicle fuel tank, is provided with an air breather passage 110, which communicates with the atmosphere, and a negative-pressure valve body 120 is mounted on the bottom of the fuel cap 100 to open or close the air breather passage 110.

The negative-pressure valve body 120 includes a spring 130, which is compressed when opening the valve body 120, and exerts elastic restoration force when closing the valve body 120.

Thus, while the engine is stopped, the negative-pressure valve body is closed by the elastic restoration force of the spring included therein, thereby preventing evaporated gas inside the fuel tank from being discharged to the atmosphere through the air breather passage.

On the other hand, while the engine is running, the negative pressure of the engine is applied from the engine intake system to the fuel tank through the canister, causing the negative-pressure valve body of the fuel cap to be opened. Thereby, atmospheric pressure is applied to the inside of the fuel tank through the air breather passage of the fuel cap, which may prevent the negative pressure from being applied to the inside of the fuel tank.

At this time, the negative pressure causes the evaporated gas collected in the canister to be supplied to the engine intake system so as to be used for engine combustion.

As described above, the fuel cap having the negative-pressure valve body provides a function of removing the negative pressure inside the fuel tank. However, the negative-pressure valve body may not be smoothly operated when exterior foreign substances (particularly, insects such as flies) enter through the air breather passage and are stuck in the negative-pressure valve body.

Therefore, although a separate mesh filter may be mounted inside the fuel cap to filter the foreign substances in order to prevent the entry of exterior foreign substances into the negative-pressure valve body, accumulation of foreign substances in the filter may cause the air breather passage to be clogged, which requires periodic filter replacement, and consequently increases manufacturing costs and repair costs.

The information disclosed in this Background of the Invention section is only for enhancement of understanding of the general background of the invention and should not be taken as an acknowledgement or any form of suggestion that this information forms the prior art already known to a person skilled in the art.

SUMMARY OF THE DISCLOSURE

Various aspects of the present invention are directed to providing a system for cleaning a fuel cap valve of a vehicle, which enables separation and removal of foreign substances stuck in a negative-pressure valve body of a fuel cap by controlling the negative pressure of an engine at a predetermined interval to supply air to the negative-pressure valve body, or by imparting chattering of repeating opening and closing the negative-pressure valve body of the fuel cap, without mounting an additional element including a mesh filter, to the fuel cap.

In one aspect, various aspects of the present invention are directed to providing a system for cleaning a fuel cap valve of a vehicle, including a fuel cap having an air breather passage and a negative-pressure valve body for opening or closing the air breather passage, a canister for collecting evaporated gas inside a fuel tank to supply the evaporated gas into an engine intake system, and a negative-pressure control mechanism for controlling an engine negative pressure, which is applied from the engine intake system to the negative-pressure valve body of the fuel cap through the canister and the fuel tank, to reach a predetermined level or more, or for controlling the engine negative pressure at a repetition interval, in a fuel cap cleaning mode for cleaning the negative-pressure valve body of the fuel cap.

In an exemplary embodiment, the negative-pressure control mechanism may include a canister-closing valve mounted on an atmosphere connection line of the canister, a purge valve mounted on a purge line that connects the canister to the engine intake system, and a controller for controlling opening or closing of the canister-closing valve and the purge valve In another exemplary embodiment, to set the engine negative pressure, applied to the negative-pressure valve body of the fuel cap to the predetermined level or more in the fuel cap cleaning mode, the controller may first control the canister-closing valve to be closed, and then control the purge valve to be opened for a predetermined time at a predetermined duty ratio.

In still another exemplary embodiment, when the negative pressure is set to the predetermined level or more, the negative pressure may cause the negative-pressure valve body to be opened and simultaneously cause air to be supplied through the negative-pressure valve body, to implement cleaning of the negative-pressure valve body.

In yet another exemplary embodiment, to control the engine negative pressure, applied to the negative-pressure valve body of the fuel cap, at the repetition interval in the fuel cap cleaning mode, the controller may control the purge valve at a predetermined duty ratio, and simultaneously control the canister-closing valve to be turned on or off at a predetermined interval, so that opening and closing of the purge valve is repeated and opening and closing of the canister-closing valve is repeated.

In still yet another exemplary embodiment, when the negative pressure is controlled at the repetition interval, the negative pressure may cause chattering, which is a repetitive operation of opening or closing the negative-pressure valve body, to implement cleaning of the negative-pressure valve body.

In a further exemplary embodiment, to set the engine negative pressure, applied to the negative-pressure valve body of the fuel cap, to the predetermined level or more in the fuel cap cleaning mode, the controller may first control the canister-closing valve to be closed, and then control the purge valve to be opened for a predetermined time at a predetermined duty ratio, and thereafter, to control the engine negative pressure, applied to the negative-pressure valve body of the fuel cap, at the repetition interval, the controller may control the purge valve at a predetermined duty ratio, and simultaneously control the canister-closing valve to be turned on or off.

In a still further exemplary embodiment, when the negative pressure is controlled to the predetermined level or more, the negative pressure may cause the negative-pressure valve body to be opened and simultaneously cause air to be supplied through the negative-pressure valve body, to implement primary cleaning of the negative-pressure valve body, and thereafter, when the negative pressure is controlled at the repetition interval, the negative pressure may cause chattering, which is a repetitive operation of opening and closing the negative-pressure valve body, to implement secondary cleaning of the negative-pressure valve body.

In a still yet further exemplary embodiment, when vehicle self-diagnosis of a fuel system is successively performed twice, the fuel cap cleaning mode may be performed between a first self-diagnosis and a second self-diagnosis.

Other aspects and exemplary embodiments of the invention are discussed infra.

It is understood that the term "vehicle" or "vehicular" or other similar term as used herein is inclusive of motor vehicles in general including passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
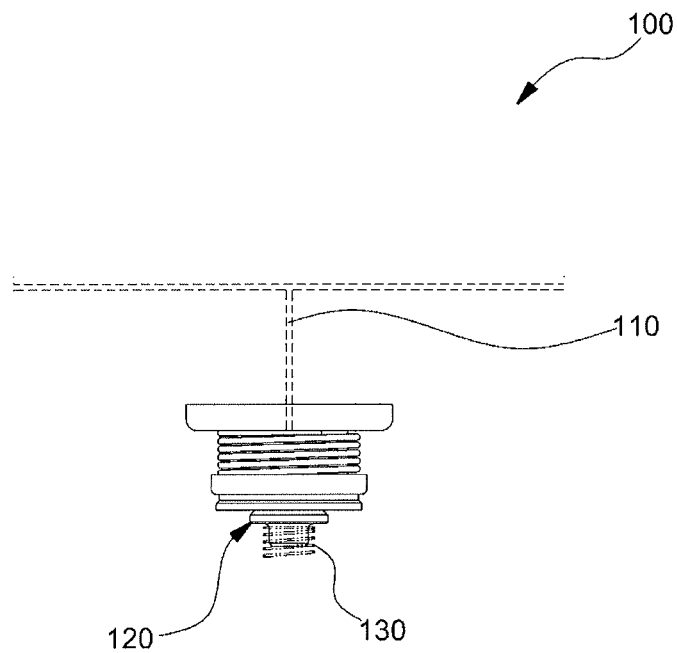
FIG. 1 is a schematic cross-sectional view illustrating the structure of a fuel cap for a vehicle.

It should be understood that the appended drawings are not necessarily to scale, presenting a somewhat simplified representation of various exemplary features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the exemplary embodiments of the present invention will be described in detail with reference to the accompanying drawings to allow those skilled in the art to easily practice the present invention.

Advantages and features of the present invention and methods for achieving the same will be clearly understood with reference to the following detailed description of embodiments in conjunction with the accompanying drawings.

However, the present invention is not limited to the embodiments included herein, but may be implemented in various different forms. The embodiments are merely given to make the disclosure of the present invention be perfect and to perfectly instruct the scope of the invention to those skilled in the art, and the present invention may be defined by the scope of claims.

In addition, in the description of the present invention, a detailed description of related known technologies and the like will be omitted when it is judged to make the subject of the present invention unclear.

Figure 2:
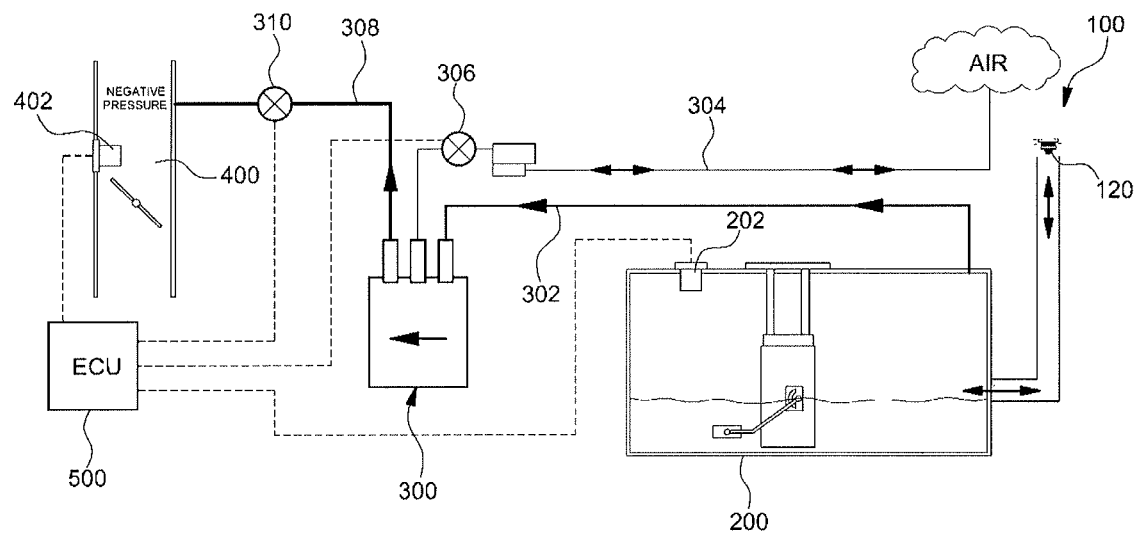
FIG. 2 is a view illustrating the configuration of a fuel cap valve cleaning system for a vehicle according to an exemplary embodiment of the present invention.

FIG. 2 is a view illustrating the configuration of a fuel cap valve cleaning system for a vehicle according to the present invention. In FIG. 2, reference numeral 100 indicates a fuel cap.

The fuel cap 100, as described above, is provided with the air breather passage 110, which communicates with the atmosphere to remove the negative pressure of an engine inside a fuel tank 200, and the negative-pressure valve body 120 is mounted on the bottom of the fuel cap 100 to open or close the air breather passage 110.

In the fuel tank 200, for example, a fuel pump is disposed to pump and supply fuel to the engine, and a fuel tank pressure sensor (FTPS) 202 is attached to measure the pressure inside the fuel tank 200.

In addition, a canister 300 is connected to the fuel tank 200 via an evaporated-gas line 302 to collect evaporated fuel gas.

In addition, the canister 300 is connected to an atmosphere connection line 304, which communicates with the atmosphere, and a canister-closing valve 306 is mounted on the atmosphere connection line 304. The canister-closing valve 306 is closed when it is turned on upon receiving current applied from a controller, and is opened when it is turned off when the current is interrupted.

At this time, the canister-closing valve 306 is controlled to be closed only in response to a vehicle failure determined through self-diagnosis, and otherwise remains in an open state. Thus, the canister-closing valve 306 is configured to maintain a balance of the pressure between a fuel system including the fuel tank and the atmosphere.

In addition, a purge line 308 connects the outlet of the canister 300, i.e. the outlet from which collected evaporated gas is discharged, to an engine intake system 400, and a purge valve 310 (e.g. a purge control solenoid valve (PCSV)) is mounted on the purge line 308.

The purge valve 310 is controlled, by a controller, to be opened only when purging the evaporated gas collected in the canister 300 using the engine intake system 400, and is controlled to be closed in, for example, the state in which the engine is stopped.

Meanwhile, the opening or closing of the canister-closing valve 306 and the purge valve 310 is controlled by a controller 500, which receives signals from, for example, an intake air pressure sensor 402 mounted in the engine intake system 400, a fuel tank pressure sensor 202 mounted in the fuel tank 200, a vehicle RPM sensor, and an intake air temperature sensor.

Here, the sequence of operation of a fuel cap cleaning mode based on the above-described configuration will be described.

First Embodiment

Figure 3:
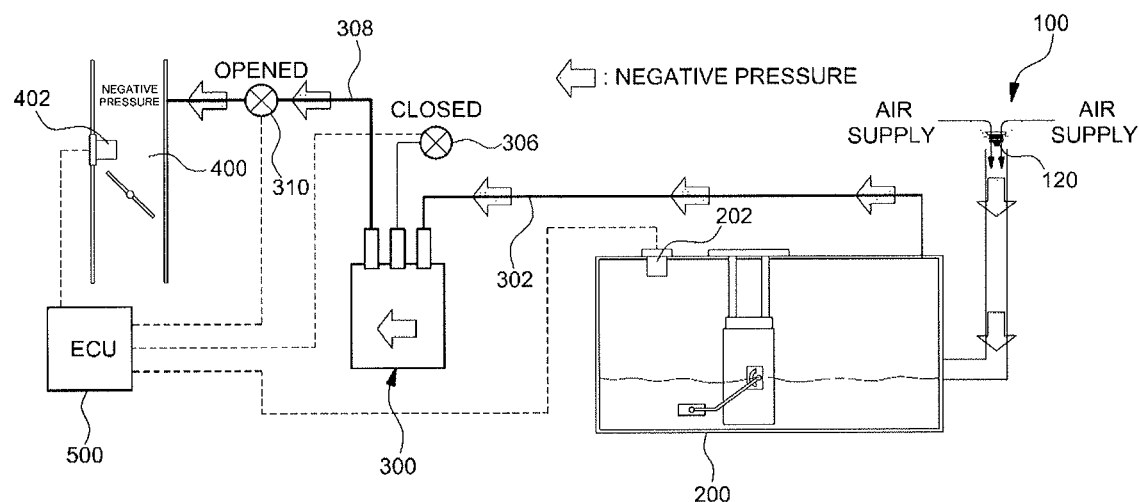
FIG. 3 is a view illustrating the state of operation of the fuel cap valve cleaning system in a fuel cap cleaning mode according to a first embodiment of the present invention.
Figure 4:
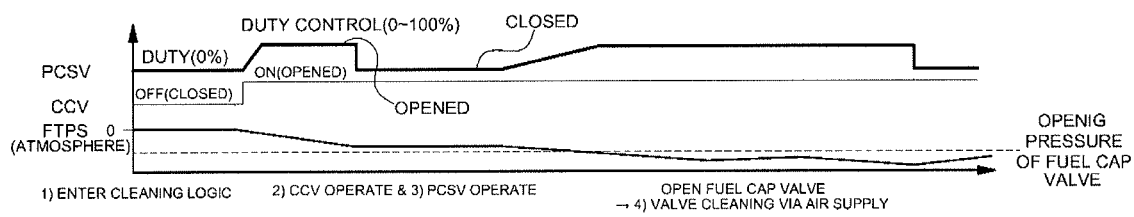
FIG. 4 is a control diagram illustrating a process of controlling the opening or closing of a canister-closing valve and a purge valve in the fuel cap cleaning mode according to the first embodiment of the present invention.

FIG. 3 is a view illustrating the state of operation of the fuel cap valve cleaning system in a fuel cap cleaning mode according to a first embodiment of the present invention, and FIG. 4 is a control diagram illustrating a process of controlling the opening or closing of the canister-closing valve and the purge valve in the fuel cap cleaning mode according to the first embodiment of the present invention.

In the fuel cap cleaning mode according to the first embodiment of the present invention, the negative pressure of the engine, which is applied from the engine intake system 400 to the fuel cap 100 through the canister 300 and the fuel tank 200, is controlled to instantaneously reach a predetermined level or more.

To this end, as negative pressure control means, the canister-closing valve 306 mounted on the atmosphere connection line 304 of the canister 300, the purge valve 310 mounted on the purge line 308 that connects the canister 300 to the engine intake system 400, and the controller 500 for controlling the opening or closing of the canister-closing valve 306 and the purge valve 310 are used.

First, the controller 500 receives, for example, a signal from the fuel tank pressure sensor 202, which measures the pressure inside the fuel tank, a signal from the intake air pressure sensor 402, which is mounted in the engine intake system (intake manifold), while the engine is running, a signal from the RPM sensor for recognizing the state in which the engine is running, and a signal from the intake air temperature sensor, and determines whether or not to enter a fuel cap cleaning mode.

The signals from, for example, the fuel tank pressure sensor 202, the intake air pressure sensor 402, and the intake air temperature sensor are used in the controller to determine whether or not the engine negative pressure is in a threshold range, and the signal from the RPM sensor is used in the controller to determine whether or not the engine is running.

Thus, when the controller 500 judges that the engine negative pressure is in the threshold range, the controller 500 determines to enter the fuel cap cleaning mode.

Accordingly, the controller 500 sets the engine negative pressure, which is applied from the engine intake system 400 to the negative-pressure valve body 120 of the fuel cap 100 through the canister 300 and the fuel tank 200, to a predetermined level or more.

To this end, the controller 500 first controls the canister-closing valve 306 to be closed to isolate the canister 300 from the atmosphere, and thereafter controls the purge valve 310 to be opened for a predetermined time at a predetermined duty ratio (0 to 100%).

Referring to FIG. 4, it can be seen that the canister-closing valve 306 is controlled from an "off" state (a continuously opened state) when no current is applied thereto to an "on" state (a closed state) when current is applied thereto, and it can be seen that the purge valve 310 is controlled to be opened for a predetermined time at a predetermined duty ratio.

At this time, after being controlled to be opened for the predetermined time, the purge valve 310 may be controlled to be closed, and may subsequently be controlled again to be opened for a predetermined time.

Accordingly, because no engine negative pressure is applied to the atmosphere via the canister-closing valve 306 when the canister-closing valve 306 is closed, it may cause the engine negative pressure from the engine intake system 400 to be applied to the negative-pressure valve body 120 of the fuel cap 100 through the canister 300 and the fuel tank 200. Moreover, the purge valve 310 is completely opened when the duty ratio thereof is increased to 100%, which may instantaneously increase the engine negative pressure, which is applied to the negative-pressure valve body 120 of the fuel cap 100.

In this way, when the engine negative pressure, which is applied to the negative-pressure valve body 120 of the fuel cap 100, is controlled to reach the predetermined level or more as described above, the negative pressure causes the negative-pressure valve body 120 to be opened, causing air to be instantaneously supplied from the air breather passage of the fuel cap 100 to the negative-pressure valve body 120. As a result, cleaning separate foreign substances (e.g. insects including flies) stuck in the negative-pressure valve body 120 may be easily performed by the flow force of the supplied air.

Second Embodiment

Figure 5:
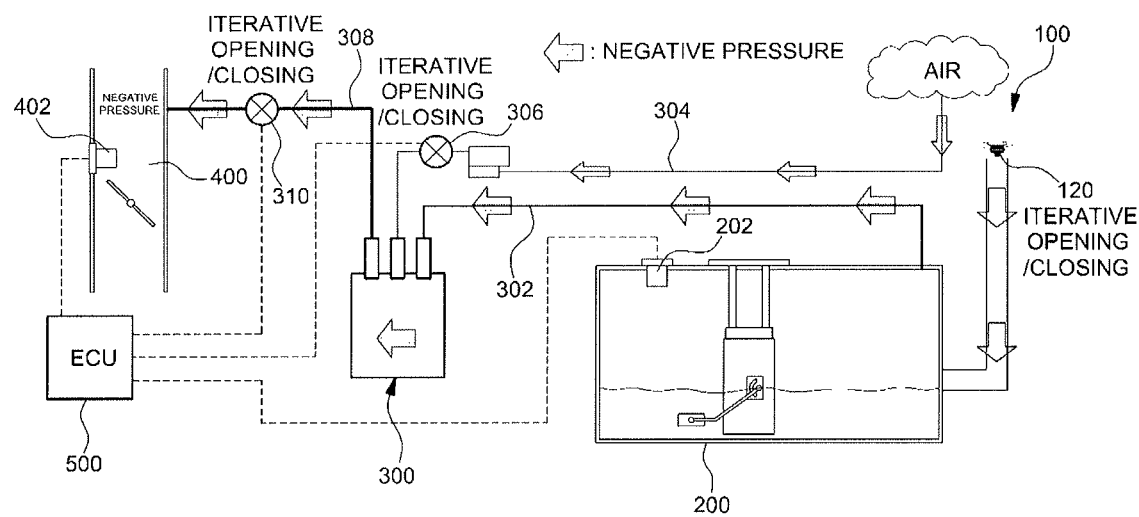
FIG. 5 is a view illustrating the state of operation of the fuel cap valve cleaning system in a fuel cap cleaning mode according to a second embodiment of the present invention.
Figure 6:
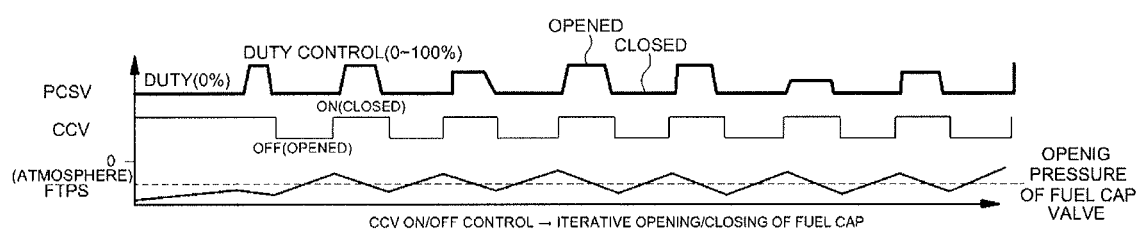
FIG. 6 is a control diagram illustrating a process of controlling the opening or closing of the canister-closing valve and the purge valve in the fuel cap cleaning mode according to the second embodiment of the present invention.

FIG. 5 is a view illustrating the state of operation of the fuel cap valve cleaning system in a fuel cap cleaning mode according to a second embodiment of the present invention, and FIG. 6 is a control diagram illustrating a process of controlling the opening or closing of the canister-closing valve and the purge valve in the fuel cap cleaning mode according to the second embodiment of the present invention.

In the fuel cap cleaning mode according to the second embodiment of the present invention, the negative pressure of the engine, which is applied from the engine intake system 400 to the fuel cap 100 through the canister 300 and the fuel tank 200, is controlled at a predetermined repetition interval.

To this end, as negative pressure control means according to the second embodiment of the present invention, the canister-closing valve 306 mounted on the atmosphere connection line 304 of the canister 300, the purge valve 310 mounted on the purge line 308 that connects the canister 300 to the engine intake system 400, and the controller 500 for controlling the opening or closing of the canister-closing valve 306 and the purge valve 310 are used in the same manner as the first embodiment.

First, the controller 500 receives, for example, a signal from the fuel tank pressure sensor 202, which measures the pressure inside the fuel tank, a signal from the intake air pressure sensor 402, which is mounted in the engine intake system (intake manifold), while the engine is running, a signal from the RPM sensor for recognizing the state in which the engine is running, and a signal from the intake air temperature sensor, and determines whether or not to enter a fuel cap cleaning mode.

The signals from, for example, the fuel tank pressure sensor 202, the intake air pressure sensor 402, and the intake air temperature sensor are used in the controller to judge whether or not the engine negative pressure is within a threshold range, and the signal from the RPM sensor is used in the controller to judge whether or not the engine is running.

Thus, when the controller 500 judges that the engine negative pressure is within the threshold range, the controller 500 determines to enter the fuel cap cleaning mode.

Accordingly, the controller 500 controls the engine negative pressure, which is applied from the engine intake system 400 to the negative-pressure valve body 120 of the fuel cap 100 through the canister 300 and the fuel tank 200, at an repetition interval.

To this end, the controller 500 controls the purge valve 310 at a predetermined duty ratio so that the purge valve 310 is repeatedly opened or closed, and simultaneously controls the canister-closing valve 306 to be turned on or off at a predetermined interval so that the canister-closing valve 306 is repeatedly opened or closed.

Referring to FIG. 6, it can be seen that the canister-closing valve 306 is repeatedly opened or closed, in other words, repeatedly switched between an "off" state (a continuously opened state) when no current is applied thereto and an "on" state (a closed state) when current is applied thereto at a predetermined interval, and it can be seen that the purge valve 310 is repeatedly opened or closed at a predetermined interval according to a controlled predetermined duty ratio.

Accordingly, through the iterative opening and closing of the purge valve 310 and the iterative opening and closing of the canister-closing valve 306, the engine negative pressure is applied from the engine intake system 400 to the negative-pressure valve body 120 of the fuel cap 100 through the canister 300 and the fuel tank 200 at a repetition interval.

In this way, when the negative pressure is applied to the negative-pressure valve body 120 of the fuel cap 100 at the repetition interval, chattering, in which the opening of the negative-pressure valve body 120 in response to the applied negative pressure and the closing of the negative-pressure valve body 120 in response to the release of the negative pressure are repeated, is implemented. As a result, cleaning to separate foreign substances (e.g. insects including flies) stuck in the negative-pressure valve body 120 may be easily performed due to vibrations by chattering.

Third Embodiment

A fuel cap cleaning mode according to a third embodiment of the present invention has the feature that the fuel cap cleaning mode according to the first embodiment and the fuel cap cleaning mode according to the second embodiment are successively performed.

To this end, to set the engine negative pressure, which is applied to the negative-pressure valve body 120 of the fuel cap 100, to a predetermined level or more, the controller 500 first controls the canister-closing valve 306 to be closed, and also controls the purge valve 310 for a predetermined time at a predetermined duty ratio, as described above in the first embodiment.

Subsequently, to control the engine negative pressure, which is applied to the negative-pressure valve body 120 of the fuel cap 100, at a repetition interval, the controller 500 controls the purge valve 310 at a predetermined duty ratio, and simultaneously controls the canister-closing valve 306 to be turned on or off at a predetermined interval, as described above in the second embodiment.

Accordingly, when the controller 500 sets the engine negative pressure, which is applied to the negative-pressure valve body 120 of the fuel cap 100, to the predetermined level or more, the engine negative pressure causes the negative-pressure valve body 120 to be opened, causing air to be instantaneously supplied from the air breather passage of the fuel cap 100 to the negative-pressure valve body 120. As a result, primary cleaning to separate foreign substances (e.g. insects including flies) stuck in the negative-pressure valve body 120 may be performed by the flow force of the supplied air.

Subsequently, when the negative pressure is applied to the negative-pressure valve body 120 of the fuel cap 100 at the repetition interval, chattering, in which the opening of the negative-pressure valve body 120 in response to the applied negative pressure and the closing of the negative-pressure valve body 120 in response to the release of the negative pressure are repeated, is implemented. As a result, secondary cleaning to separate foreign substances (e.g. insects including flies) stuck in the negative-pressure valve body 120 may be performed due to vibrations by chattering.

In this way, according to the third embodiment of the present invention, the negative-pressure valve body 120 is primarily cleaned using air supplied from the atmosphere, and is then secondarily cleaned via chattering caused by the iterative opening and closing of the negative-pressure valve body 120, which may maximize fuel cap cleaning.

Fourth Embodiment

A fourth embodiment of the present embodiment has the feature that chattering may be imparted on the negative-pressure valve body 120 by controlling the purge valve 310 to be turned on or off without controlling the canister-closing valve 306 to be turned on or off.

To this end, to control the engine negative pressure, which is applied to the negative-pressure valve body 120 of the fuel cap 100, at a repetition interval in the fuel cap cleaning mode, the controller 500 controls the canister-closing valve 306 to be closed, and then controls the purge valve 310 at a predetermined duty ratio so that the purge valve 310 is repeatedly opened and closed.

Accordingly, chattering may be imparted on the negative-pressure valve body 120 by the negative pressure applied to the negative-pressure valve body 120 at a repetition interval. As a result, cleaning to separate foreign substances (e.g. insects including flies) stuck in the negative-pressure valve body 120 may be performed due to vibrations by chattering.

Figure 7:
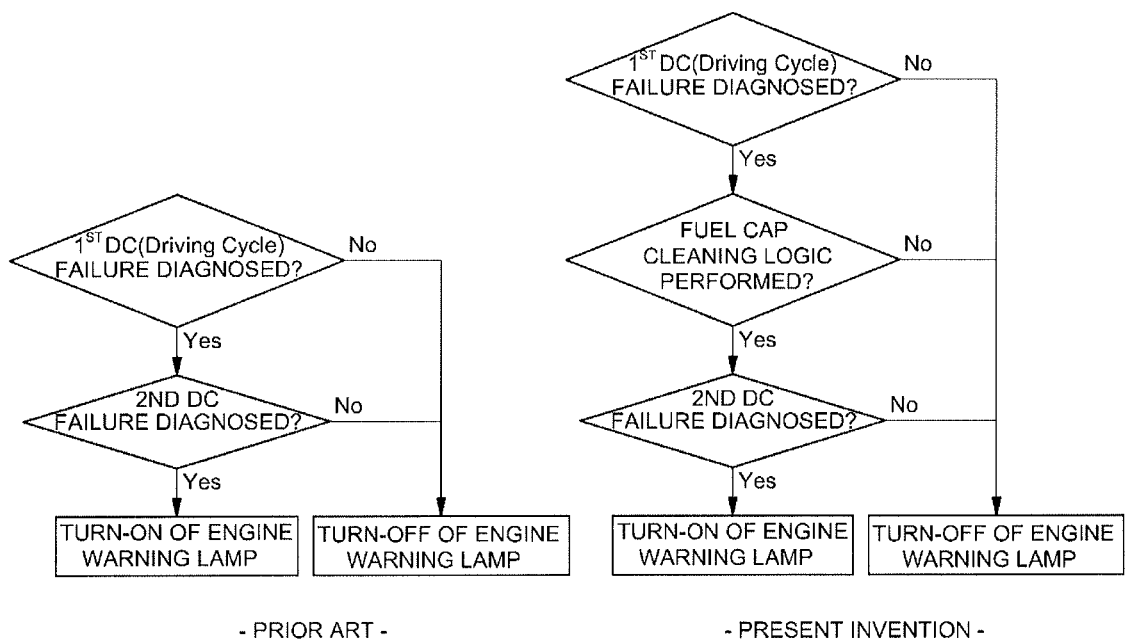
FIG. 7 is a flowchart illustrating a time point when the fuel cap cleaning mode according to the present invention is implemented.

Meanwhile, referring to FIG. 7, currently, on-board diagnostics (OBD) with respect to a vehicle fuel system includes a predetermined driving cycle (DC), which is successively performed twice. When failure of the fuel system is judged twice, an engine warning lamp is turned on.

In consideration of the above, when vehicle's self-diagnosis with respect to the fuel system is successively performed twice, the fuel cap cleaning mode according to the first to third embodiments of the present invention may be performed between the first self-diagnosis and the second self-diagnosis. This is because the fuel system may be judged to be normal when it is checked that the engine warning lamp is not turned on based on the result of diagnosis of the fuel system after the cleaning mode of the present invention is performed.

In other words, although the engine warning lamp may be turned on based on failure determined through self-diagnosis when the negative-pressure valve body of the fuel cap is not correctly operated due to foreign substances stuck therein, the fuel system may be judged to be normal when it is checked that the engine warning lamp remains turned off based on the result of diagnosis of the fuel system after the cleaning mode of the present invention is performed.

As is apparent from the above description, various aspects of the present invention are directed to providing the following effects.

First, when the negative pressure of an engine, which is applied to a negative-pressure valve body of a fuel cap, is controlled to reach a predetermined level or more, the negative-pressure valve body of the fuel cap is opened so that air is supplied through the negative-pressure valve body. As a result, external foreign substances (e.g. insects including flies) stuck in the negative-pressure valve body may be easily separated and removed by the supplied air.

Second, when the engine negative pressure, which is applied to the negative-pressure valve body of the fuel cap, is controlled at a predetermined repetition interval, chattering caused by the iterative opening and closing of the negative-pressure valve body of the fuel cap is implemented. As a result, external foreign substances stuck in the negative-pressure valve body may be easily separated and removed due to vibrations by chattering.

Third, when the engine negative pressure, which is applied to the negative-pressure valve body of the fuel cap, is controlled to reach a predetermined level or more, and subsequently, is controlled at a predetermined repetition interval, the negative-pressure valve body may be primarily cleaned by air supplied from the atmosphere and then secondarily cleaned by chattering caused by the iterative opening and closing of the negative-pressure valve body, which may maximize fuel cap cleaning.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A system for cleaning a fuel cap valve of a vehicle, the system comprising:
    a fuel cap having an air breather passage and a negative-pressure valve body configured for opening or closing the air breather passage;
    a canister configured for collecting evaporated gas inside a fuel tank to supply the evaporated gas into an engine intake system; and
    a negative-pressure control device configured for controlling an engine negative pressure, which is applied from the engine intake system to the negative-pressure valve body of the fuel cap through the canister and the fuel tank, to reach a predetermined level or more, or for controlling the engine negative pressure at a repetition interval, in a fuel cap cleaning mode for cleaning the negative-pressure valve body of the fuel cap,
    wherein the negative-pressure control device includes:
        a canister-closing valve mounted on an atmosphere connection line of the canister;
        a purge valve mounted on a purge line that connects the canister to the engine intake system; and
        a controller configured for controlling opening or closing of the canister-closing valve and the purge valve,
    wherein, to control the engine negative pressure, applied to the negative-pressure valve body of the fuel cap, at the repetition interval in the fuel cap cleaning mode, the controller is configured to control the purge valve at a predetermined duty ratio, and simultaneously controls the canister-closing valve to be turned on or off at a predetermined interval, wherein opening and closing of the purge valve is repeated and opening and closing of the canister-closing valve is repeated, and
    wherein, when the engine negative pressure is configured to be controlled at the repetition interval, the engine negative pressure causes chattering, which is a repetitive operation of opening and closing the negative-pressure valve body, to implement cleaning of the negative-pressure valve body.

2. The system of claim 1, wherein, to control the engine negative pressure, applied to the negative-pressure valve body of the fuel cap, to the predetermined level or more in the fuel cap cleaning mode, the controller first controls the canister-closing valve to be closed, and then controls the purge valve to be opened for a predetermined time at a predetermined duty ratio.

3. The system of claim 2, wherein, when the engine negative pressure is set to the predetermined level or more, the ping negative pressure causes the negative-pressure valve body to be opened and simultaneously causes air to be supplied through the negative-pressure valve body, to implement cleaning of the negative-pressure valve body.

4. The system of claim 1, wherein, to control the engine negative pressure, applied to the negative-pressure valve body of the fuel cap, to the predetermined level or more in the fuel cap cleaning mode, the controller first controls the canister-closing valve to be closed, and then controls the purge valve to be opened for a predetermined time at a predetermined duty ratio, and thereafter, to control the engine negative pressure, applied to the negative-pressure valve body of the fuel cap, at the repetition interval, the controller is configured to control the purge valve at a predetermined duty ratio, and simultaneously controls the canister-closing valve to be turned on or off at a predetermined interval.

5. The system of claim 4, wherein, when the engine negative pressure is configured to be controlled to the predetermined level or more, the engine negative pressure causes the negative-pressure valve body to be opened and simultaneously causes air to be supplied through the negative-pressure valve body, to implement primary cleaning of the negative-pressure valve body, and thereafter, when the engine negative pressure is configured to be controlled at the repetition interval, the engine negative pressure causes chattering, which is a repetitive operation of opening and closing the negative-pressure valve body, to implement secondary cleaning of the negative-pressure valve body.

6. The system of claim 1, wherein, to control the engine negative pressure applied to the negative-pressure valve body of the fuel cap at the repetition interval in the fuel cap cleaning mode, the controller is configured to control the canister-closing valve to be closed and then controls the purge valve to be repeatedly opened and closed at a predetermined duty ratio.

7. The system of claim 1, wherein, when vehicle self-diagnosis of a fuel system is successively performed twice, the fuel cap cleaning mode is performed between a first self-diagnosis and a second self-diagnosis.

* * * * *